United States Patent
Takemoto

(10) Patent No.: US 11,654,845 B2
(45) Date of Patent: May 23, 2023

(54) CONTROL DEVICE, VEHICLE, CONTROL METHOD, AND STORAGE MEDIUM STORING A CONTROL PROGRAM

(71) Applicant: TOYOTA JIDOSHA KABUSHIKI KAISHA, Toyota (JP)

(72) Inventor: Taiki Takemoto, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/591,848

(22) Filed: Feb. 3, 2022

(65) Prior Publication Data

US 2022/0289130 A1 Sep. 15, 2022

(30) Foreign Application Priority Data

Mar. 9, 2021 (JP) .............................. JP2021-037730

(51) Int. Cl.
| | |
|---|---|
| B60R 16/033 | (2006.01) |
| H02M 1/32 | (2007.01) |
| H02M 3/04 | (2006.01) |
| H02J 7/00 | (2006.01) |
| B60L 50/50 | (2019.01) |

(52) U.S. Cl.
CPC .......... *B60R 16/033* (2013.01); *H02J 7/0063* (2013.01); *H02M 1/327* (2021.05); *H02M 3/04* (2013.01); *B60L 50/50* (2019.02)

(58) Field of Classification Search
None
See application file for complete search history.

(56) References Cited

U.S. PATENT DOCUMENTS

| | | |
|---|---|---|
| 2013/0099559 A1 | 4/2013 | Machi et al. |
| 2020/0036210 A1* | 1/2020 | Muratsu .................... H02J 7/06 |
| 2020/0070753 A1* | 3/2020 | Akuzawa .............. B60R 16/033 |

FOREIGN PATENT DOCUMENTS

JP 5387651 B2 1/2014

* cited by examiner

*Primary Examiner* — Jared Fureman
*Assistant Examiner* — Aqeel H Bukhari
(74) *Attorney, Agent, or Firm* — Oliff PLC

(57) ABSTRACT

A control device to control a first DC-DC converter and a second DC-DC converter that supply power to equipment, the control device comprising a processor configured to: determine whether or not a predetermined condition is satisfied; and in a case in which a predetermined condition is determined to be satisfied, perform control to switch which of the DC-DC converters is prioritized for power supply to the equipment.

9 Claims, 7 Drawing Sheets

CONTROL DEVICE, VEHICLE, CONTROL METHOD, AND STORAGE MEDIUM STORING A CONTROL PROGRAM

CROSS-REFERENCE TO RELATED APPLICATION

This application is based on and claims priority under 35 USC 119 from Japanese Patent Application No. 2021-037730 filed on Mar. 9, 2021, the disclosure of which is incorporated by reference herein.

BACKGROUND

Technical Field

The present disclosure relates to a control device, a vehicle, a control method, and a storage medium storing with a control program.

Related Art

Japanese Patent No. 5387651 discloses a power supply system for performing coordinated control of plural DC-DC converters.

Persistent use of a single DC-DC converter entails the possibility of premature faults occurring in this DC-DC converter due to a poorly balanced distribution of stress.

SUMMARY

An object of the present disclosure is to provide a control device, a vehicle, a control method, and a storage medium storing a control program capable of utilizing plural DC-DC converter in a well-balanced manner so as to suppress the occurrence of premature faults.

Solution to Problem

A control device of a first aspect is a control device to control a first DC-DC converter and a second DC-DC converter that supply power to equipment, the control device including a determination section configured to determine whether or not a predetermined condition is satisfied, and a control section configured to, in a case in which the determination section determines a predetermined condition to be satisfied, perform control to switch which of the DC-DC converters is prioritized for power supply to the equipment.

The control device of the first aspect controls the first DC-DC converter and the second DC-DC converter. The first DC-DC converter and the second DC-DC converter are both configured to be capable of supplying power to the same equipment. The determination section of the control device determines whether or not a predetermined condition is satisfied, and in a case in which the determination section determines the predetermined condition to be satisfied, the control section switches which of the DC-DC converters is prioritized for power supply to the equipment.

This control device switches which of the DC-DC converters is prioritized for use in response to a trigger of the predetermined condition, enabling the respective DC-DC converters to be utilized in a well-balanced manner, and thereby enabling the occurrence of premature faults to be suppressed.

A control device of a second aspect is the control device of the first aspect, wherein the determination section is configured to determine the predetermined condition to be satisfied in a case in which a temperature pertaining to the first DC-DC converter has risen to a first temperature, and in that case, the control section is configured to switch a main DC-DC converter prioritized for power supply from the first DC-DC converter to the second DC-DC converter.

In the control device of the second aspect, the main DC-DC converter is switched to the second DC-DC converter in a case in which the temperature pertaining to the first DC-DC converter has risen to the first temperature. This enables disproportionately heavy utilization of the first DC-DC converter to be suppressed.

A control device of a third aspect is the control device of the second aspect, wherein the determination section is configured to determine a predetermined condition to be satisfied in a case in which the temperature pertaining to the first DC-DC converter has dropped to a second temperature lower than the first temperature, and in that case, the control section is configured to switch the main DC-DC converter prioritized for power supply from the second DC-DC converter to the first DC-DC converter.

In the control device of the third aspect, the second temperature configures a condition for switching from the second DC-DC converter to the first DC-DC converter when the temperature pertaining to the first DC-DC converter has dropped. The second temperature is set to a lower temperature than the first temperature. Namely, in this control device, a temperature difference is provided between the condition for switching from the first DC-DC converter to the second DC-DC converter, and the condition for switching from the second DC-DC converter to the first DC-DC converter. The control device is thus capable of suppressing hunting, in which frequent switching between the two DC-DC converters occurs.

A control device of a fourth aspect is the control device of any one of the first aspect to the third aspect, wherein the control section is configured to gradually raise power output of a sub DC-DC converter, and thereafter lower power output of a main DC-DC converter to switch which of the DC-DC converters is prioritized for power supply.

According to the control device of the fourth aspect, the output of the sub DC-DC converter is gradually raised for switching over the main DC-DC converter, enabling a sudden change in the power supply to the equipment during switching of the DC-DC converters to be suppressed.

A control device of a fifth aspect is the control device of the fourth aspect, wherein for switching which of the DC-DC converters is prioritized for power supply, the control section gradually raises an instructed voltage value of the sub DC-DC converter, and then, when the instructed voltage value of the sub DC-DC converter has reached an instructed voltage value of the main DC-DC converter, controls the instructed voltage value of the main DC-DC converter to a lower value than the instructed voltage value of the sub DC-DC converter.

According to the control device of the fifth aspect, switching control of the DC-DC converters is performed based on the instructed voltage values of the respective DC-DC converters, thereby suppressing sudden voltage changes in the equipment, and enabling operational stability of the equipment to be secured.

A control device of a sixth aspect is the control device of any one of the first aspect to the fifth aspect, wherein in a case in which an instructed voltage value of a main DC-DC converter is less than a maximum value, the control section performs feedback control such that the instructed voltage value of the main DC-DC converter becomes a target value, and performs control such that an instructed voltage value of a sub DC-DC converter becomes a lower value than the instructed voltage value of the main DC-DC converter, and in a case in which the instructed voltage value of the main DC-DC converter has reached the maximum value, the control section performs control such that the instructed voltage value of the main DC-DC converter remains at the maximum value and performs feedback control such that the instructed voltage value of the sub DC-DC converter becomes a target value.

The target value is, for example, a reference value of a battery voltage supplied to the equipment. The control device of the sixth aspect is capable of maintaining the equipment voltage by performing feedback control of the sub DC-DC converter in cases in which the output of the main DC-DC converter is at its maximum.

A vehicle of a seventh aspect includes the control device of any one of the first aspect to the sixth aspect, a high voltage battery configured to supply power to each of the first DC-DC converter and the second DC-DC converter, and an auxiliary equipment battery configured to supply power to the equipment and to receive power supplied from each of the first DC-DC converter and the second DC-DC converter.

According to the vehicle of the seventh aspect, the DC-DC converter prioritized for use is switched in response to a trigger of the predetermined condition, enabling the voltage of the auxiliary equipment battery to be stabilized while suppressing disproportionately heavy utilization of either one of the DC-DC converters.

A control method of an eighth aspect is a control method for execution by a computer to control a first DC-DC converter and a second DC-DC converter that supply power to equipment, the control method including determining whether or not a predetermined condition is satisfied, and in a case in which a predetermined condition is determined to be satisfied, performing control to switch which of the DC-DC converters is prioritized for power supply to the equipment.

The control method of the eighth aspect is a method for controlling the first DC-DC converter and the second DC-DC converter. As described above, the first DC-DC converter and the second DC-DC converter are both configured to be capable of supplying power to the same equipment. According to this control method, a computer determines whether or not a predetermined condition is satisfied, and in cases in which the predetermined condition is determined to be satisfied, the computer switches which of the DC-DC converters is prioritized for power supply to the equipment. According to this control method, the DC-DC converter prioritized for use is switched in response to a trigger of the predetermined condition, enabling the respective DC-DC converters to be utilized in a well-balanced manner, and thereby enabling the occurrence of premature faults to be suppressed.

A ninth aspect is a non-transitory storage medium storing a control program. The control program is a control program to control a first DC-DC converter and a second DC-DC converter that supply power to equipment, by causing a computer to execute processing including determining whether or not a predetermined condition is satisfied, and in a case in which a predetermined condition is determined to be satisfied, performing control to switch which of the DC-DC converters is prioritized for power supply to the equipment.

The control program stored in the non-transitory storage medium of the ninth aspect causes a computer to execute control of the first DC-DC converter and the second DC-DC converter. As described above, the first DC-DC converter and the second DC-DC converter are both configured to be capable of supplying power to the same equipment. According to this program, a computer determines whether or not a predetermined condition is satisfied, and in cases in which the predetermined condition is determined to be satisfied, the computer switches which of the DC-DC converters is prioritized for power supply to the equipment. According to this program, the computer switches the DC-DC converter prioritized for use in response to a trigger of the predetermined condition, enabling the respective DC-DC converters to be utilized in a well-balanced manner, and thereby enabling the occurrence of premature faults to be suppressed.

The present disclosure enables plural DC-DC converters to be utilized in a well-balanced manner so as to suppress the occurrence of premature faults.

BRIEF DESCRIPTION OF THE DRAWINGS

Exemplary embodiments of the present disclosure will be described in detail based on the following figures, wherein.

DETAILED DESCRIPTION

Detailed explanation follows regarding examples of exemplary embodiments of the present disclosure, with reference to the drawings.

First Exemplary Embodiment

Configuration

Figure 1:
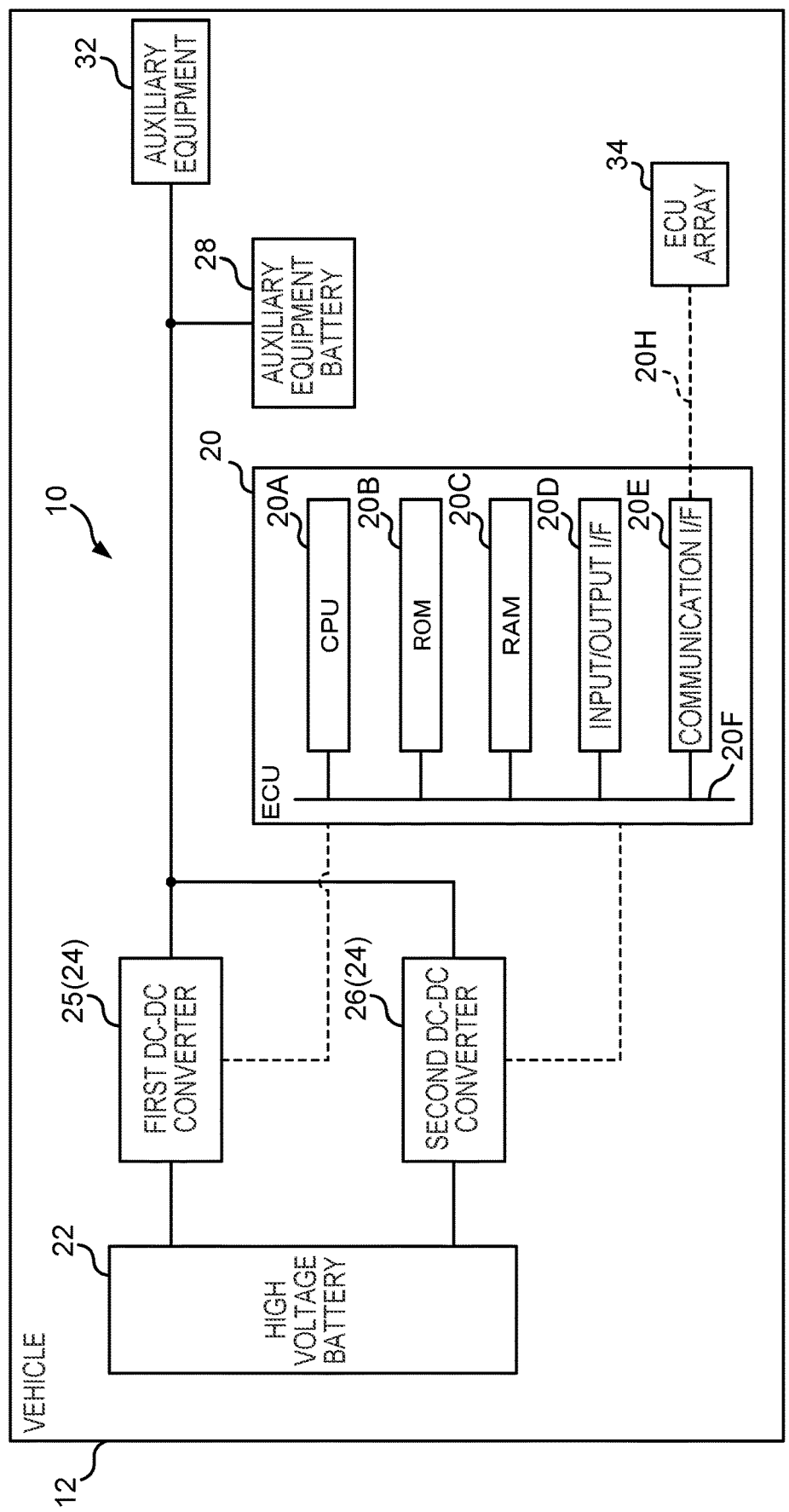
FIG. 1 is a schematic configuration diagram illustrating a vehicle and a power supply system according to a first exemplary embodiment.

As illustrated in FIG. 1, a power supply system 10 of the first exemplary embodiment is installed in a vehicle 12. The vehicle 12 is, for example, an electric vehicle (EV) or a hybrid vehicle (HV). The vehicle 12 of the present exemplary embodiment is supplied with power by the power supply system 10. The vehicle 12 includes auxiliary equipment 32 that is equipment that operates respective sections of the vehicle 12, and an ECU array 34 that controls respective sections of the vehicle 12, including the auxiliary equipment 32.

The power supply system 10 is configured including an ECU 20 serving as a control device, a high voltage battery 22, DC-DC converters 24, and an auxiliary equipment battery 28. The ECU 20 will be described in detail later. The DC-DC converters 24 of the present exemplary embodiment include a first DC-DC converter 25 and a second DC-DC converter 26.

The high voltage battery 22 is a high voltage battery used to operate a travel motor and the like involved in driving the vehicle 12. The high voltage battery 22 is a rechargeable battery capable of charging and discharging, such as a lithium battery or a nickel-hydrogen battery. The high voltage battery 22 is connected to the first DC-DC converter 25 and the second DC-DC converter 26.

The first DC-DC converter 25 includes functionality to supply power output by the high voltage battery 22 to the auxiliary equipment battery 28 and the auxiliary equipment 32. The high voltage battery 22 is connected to an input side of the first DC-DC converter 25, and the auxiliary equipment battery 28 and the auxiliary equipment 32 are connected to an output side of the first DC-DC converter 25. When supplied with power, the first DC-DC converter 25 steps down the input voltage, namely the output voltage of the high voltage battery 22, to a predetermined voltage based on an instruction from the ECU 20, and outputs the stepped-down voltage to the auxiliary equipment battery 28 and the auxiliary equipment 32.

The second DC-DC converter 26 has similar functionality to that of the first DC-DC converter 25. Namely, the second DC-DC converter 26 includes functionality to supply power output by the high voltage battery 22 to the auxiliary equipment battery 28 and the auxiliary equipment 32. The high voltage battery 22 is connected to an input side of the second DC-DC converter 26, and the auxiliary equipment battery 28 and the auxiliary equipment 32 are connected to an output side of the second DC-DC converter 26. When supplied with power, the second DC-DC converter 26 steps down the input voltage, namely the output voltage of the high voltage battery 22, to a predetermined voltage based on an instruction from the ECU 20, and outputs the stepped-down voltage to the auxiliary equipment battery 28 and the auxiliary equipment 32.

Note that in the power supply system 10 of the present exemplary embodiment, the ECU 20, described later, controls which of the DC-DC converters 24 is prioritized for power supply to the auxiliary equipment 32.

The auxiliary equipment battery 28 is a battery capable of operating the auxiliary equipment 32, and is configured by a rechargeable battery capable of charging and discharging, such as a lead-acid battery or a lithium ion battery. The auxiliary equipment battery 28 is connected to both the first DC-DC converter 25 and the second DC-DC converter 26, and is capable of receiving power supply from the first DC-DC converter 25 and the second DC-DC converter 26 respectively. The auxiliary equipment battery 28 is connected to the auxiliary equipment 32 of the vehicle 12, and supplies power to the auxiliary equipment 32.

The ECU 20 is, for example, configured by a microcomputer, and includes functionality to control the first DC-DC converter 25 and the second DC-DC converter 26. The ECU 20 thereby supplies power from the high voltage battery 22 to the auxiliary equipment battery 28 and the auxiliary equipment 32 via the first DC-DC converter 25 and the second DC-DC converter 26.

The ECU 20 is configured including a central processing unit (CPU) 20A, read only memory (ROM) 20B, random access memory (RAM) 20C, an input/output interface (I/F) 20D, and a communication I/F 20E. The CPU 20A, the ROM 20B, the RAM 20C, the input/output I/F 20D, and the communication I/F 20E are connected together through an internal bus 20F so as to be capable of communicating with each other. The CPU 20A is an example of a processor, and the RAM 20C is an example of memory.

The CPU 20A is a central processing unit that executes various programs and controls various sections. Namely, the CPU 20A reads a program from the ROM 20B, and executes the program using the RAM 20C as a workspace.

Figure 2:
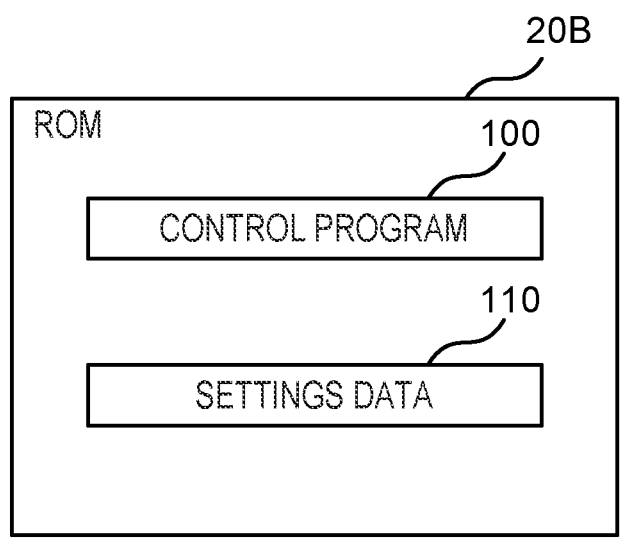
FIG. 2 is a block diagram illustrating configuration of a ROM of an ECU of the first exemplary embodiment.

The ROM 20B serves as a storage section, and stores various programs and various data. As illustrated in FIG. 2, the ROM 20B of the present exemplary embodiment stores a control program 100 and settings data 110.

The control program 100 is a program used to control the ECU 20. The ECU 20 controls the first DC-DC converter 25 and the second DC-DC converter 26 under control based on the control program.

The settings data 110 stores control parameters for feedback control of each of the DC-DC converters. The settings data 110 also stores setting values for a first temperature configuring a condition for switching from the first DC-DC converter 25 to the second DC-DC converter 26 and a second temperature configuring a condition for switching from the second DC-DC converter 26 to the first DC-DC converter 25.

As illustrated in FIG. 1, the RAM 20C serves as a workspace that temporarily stores programs and data.

The input/output I/F 20D is an interface for communicating with the first DC-DC converter 25 and the second DC-DC converter 26 respectively.

The communication I/F 20E is an interface for connecting to the ECU array 34. This interface may employ a communication protocol such as a CAN. The communication I/F 20E is connected to an external bus 20H. The ECU 20 is thus capable of acquiring operational statuses of respective sections of the vehicle 12 via the communication I/F 20E.

Note that the ECU 20 may include storage, serving as a storage section, in addition to the ROM 20B, or instead of the ROM 20B. Such storage may, for example, be configured by a hard disk drive (HDD) or a solid state drive (SSD).

Figure 3:
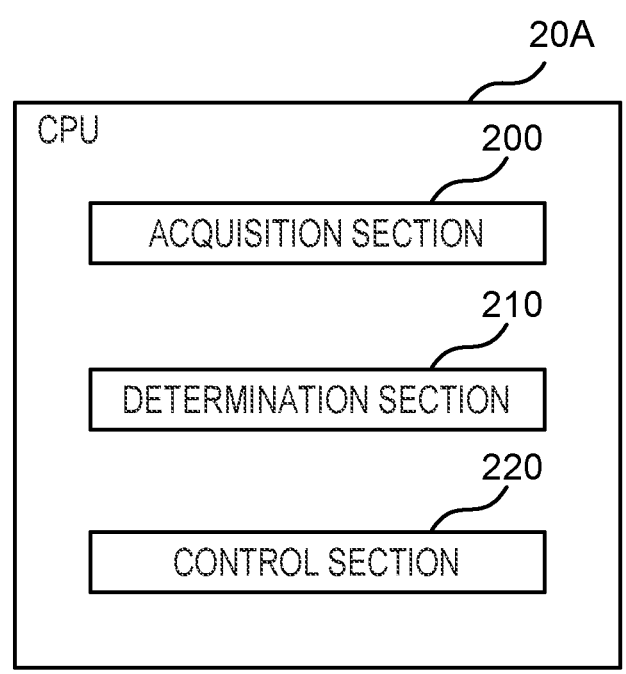
FIG. 3 is a block diagram illustrating functional configuration of a CPU of an ECU of the first exemplary embodiment.

As illustrated in FIG. 3, the CPU 20A of the ECU 20 of the present exemplary embodiment executes the control program 100 in order to function as an acquisition section 200, a determination section 210, and a control section 220.

The acquisition section 200 includes functionality to acquire respective states of the first DC-DC converter 25 and the second DC-DC converter 26. Note that the states acquired from the respective DC-DC converters 24 include an output voltage and a cooling water temperature of each DC-DC converter 24. The acquisition section 200 also acquires a voltage of the auxiliary equipment battery 28. The acquisition section 200 is also capable of acquiring operational statuses of respective sections including the auxiliary equipment 32 of the vehicle 12 from the ECU array 34.

The determination section 210 includes functionality to determine whether or not predetermined conditions for switching the priority of the DC-DC converters 24 have been satisfied. These predetermined conditions include a first switching condition and a second switching condition. The first switching condition is a condition for switching from the first DC-DC converter 25 to the second DC-DC converter 26, and the second switching condition is a condition for switching from the second DC-DC converter 26 to the first DC-DC converter 25. The determination section 210 of the present exemplary embodiment determines the first switching condition to be satisfied in cases in which the cooling water temperature of the first DC-DC converter 25 has risen to a first temperature. The determination section 210 determines the second switching condition to be satisfied in cases in which a temperature pertaining to the first DC-DC converter 25 has decreased to a second temperature that is lower than the first temperature by a fixed value T.

Setting the value of T too small would result in frequent alternation of priorities between the DC-DC converters 24 during transition processing, described later. Accordingly, the value of T is set to a value that does not result in frequent alternation of priorities between the DC-DC converters 24, while not leaning excessively toward either the first DC-DC converter 25 or the second DC-DC converter 26 as the prioritized DC-DC converter 24. The determination section 210 changes a control flag in cases in which the first switching condition or the second switching condition is determined to be newly satisfied. Specifically, the determination section 210 changes the control flag from 0 to 1 in cases in which the first switching condition has been satisfied, and changes the control flag from 1 to 0 in cases in which the second switching condition has been satisfied.

The control section 220 performs power control processing to control the output of the respective DC-DC converters 24. Note that the DC-DC converter 24 prioritized for power supply will be referred to as the main DC-DC converter 24, and the DC-DC converter 24 over which the main DC-DC converter 24 takes priority will be referred to as the sub DC-DC converter 24. The control section 220 of the present exemplary embodiment regulates the power output of each of the DC-DC converters 24 by regulating instructed voltage values thereof. Under normal circumstances, the control section 220 performs control to set the instructed voltage value of the sub DC-DC converter 24 to a value that is lower than the instructed voltage value of the main DC-DC converter 24 by a predetermined value V, such that the output of the main DC-DC converter 24 is prioritized.

Note that if the value V is set too large, in cases in which load of the auxiliary equipment 32 increases such that the output of the first DC-DC converter 25 becomes insufficient, a voltage supplemented by the output of the second DC-DC converter 26 will become too low. Conversely, if the value V is too small, the output priority relationship may be disrupted as a result of variation in the outputs of the two DC-DC converters 24, rendering the prioritization of output by the DC-DC converters 24 as originally envisaged unachievable. Accordingly, in the present exemplary embodiment, the value of V is set in a range in which such issues are unlikely to arise.

The control section 220 also executes transition processing for switching between the DC-DC converters 24. This transition processing will be described in detail later.

Flow of Control

Figure 4:
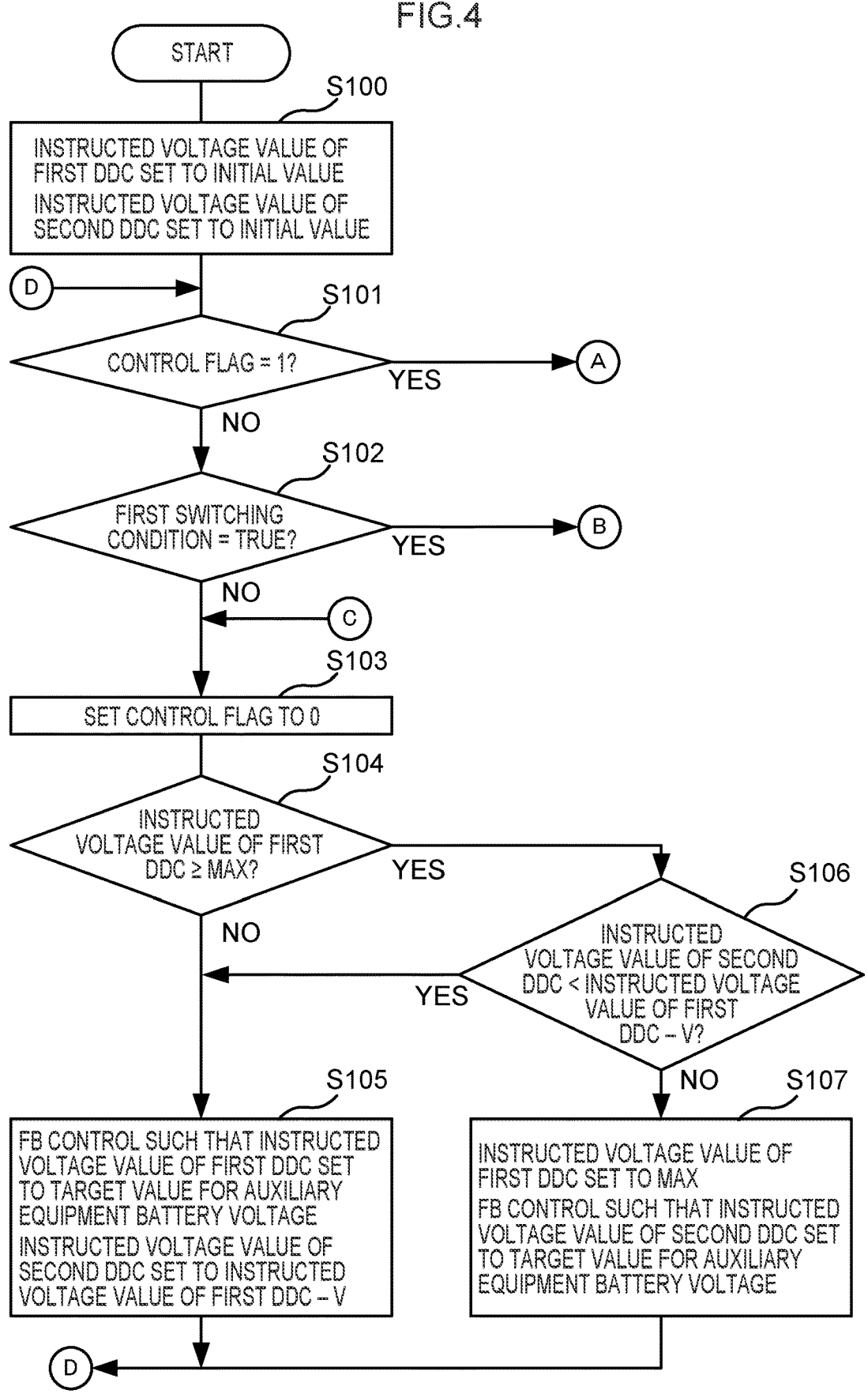
FIG. 4 is a flowchart illustrating a flow of power control processing of the first exemplary embodiment.
Figure 5:
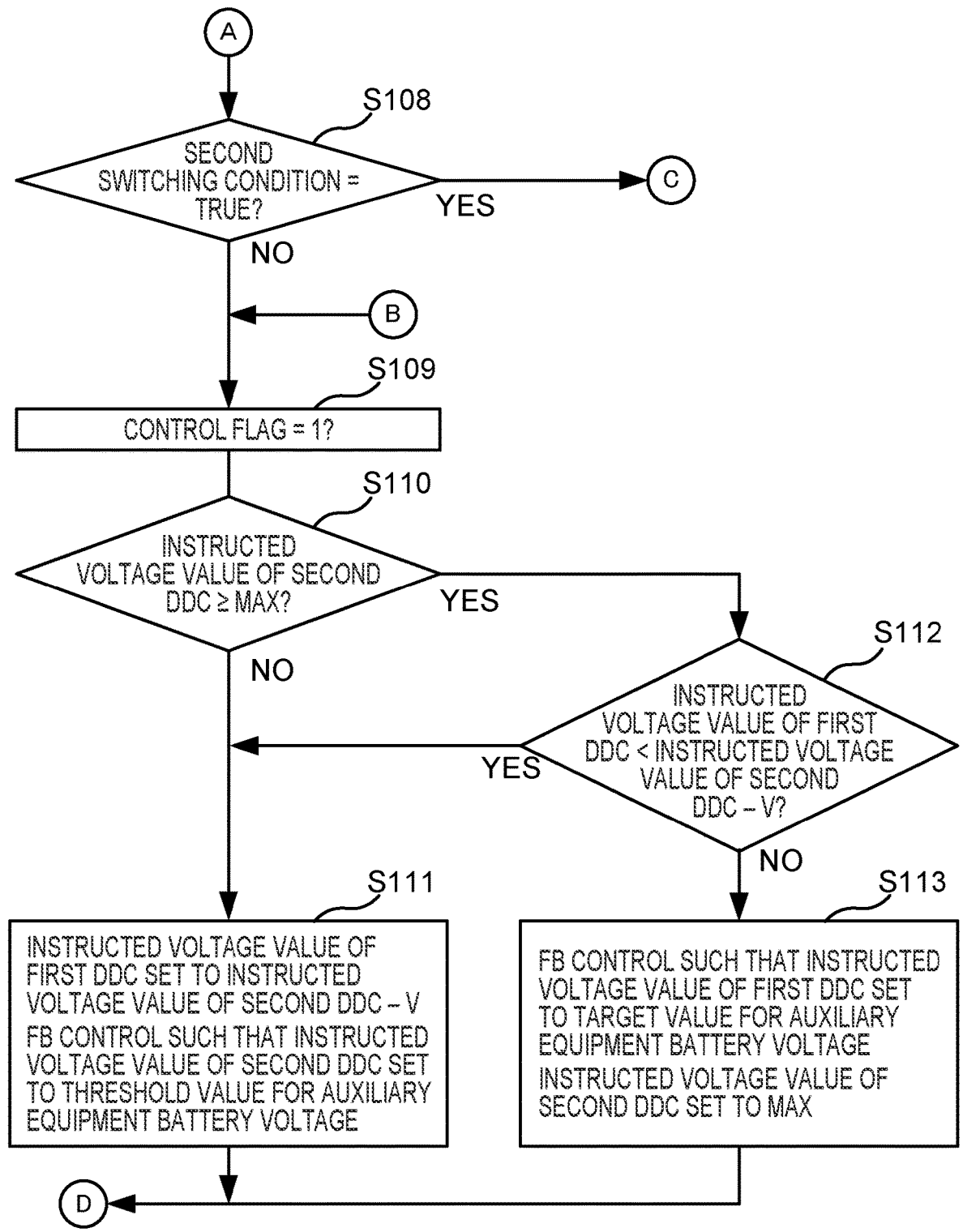
FIG. 5 is a flowchart illustrating a flow of power control processing of the first exemplary embodiment (continued from FIG. 4)
Figure 6:
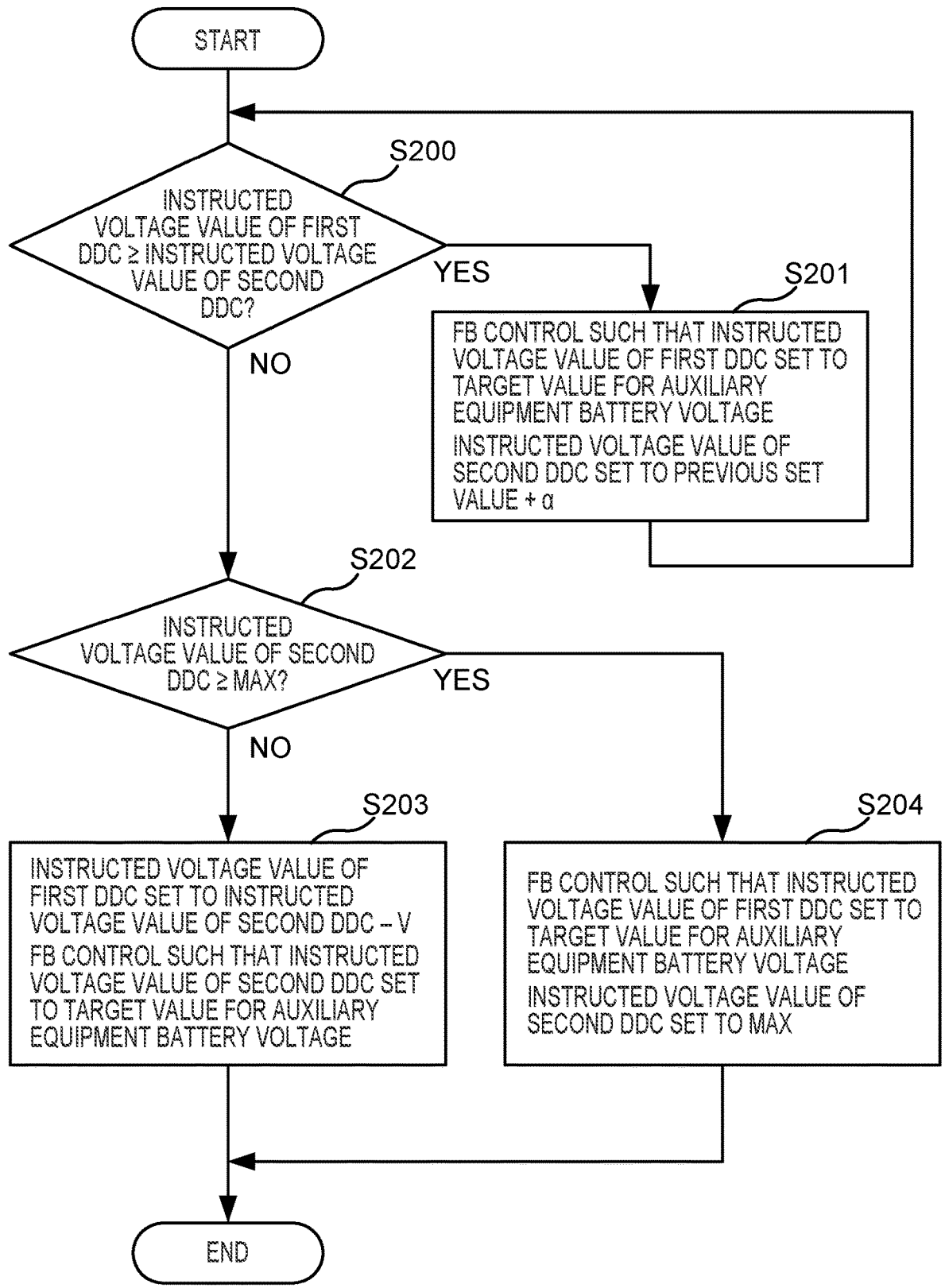
FIG. 6 is a flowchart illustrating a flow of transition processing of the first exemplary embodiment.

Explanation follows regarding a flow of processing executed by the ECU 20 of the present exemplary embodiment, with reference to the flowcharts of FIG. 4 to FIG. 6. The processing by the ECU 20 is implemented by the CPU 20A functioning as the acquisition section 200, the determination section 210, and the control section 220 described above. Note that in each of the drawings, "DC-DC converter" is abbreviated to "DDC", and the "feedback control" is abbreviated to "FB control".

First, explanation follows regarding the power control processing illustrated in FIG. 4 and FIG. 5. In the power control processing serving as a control method, the instructed voltage values of the respective DC-DC converters 24 are set so as to control the outputs thereof.

At step S100 in FIG. 4, the CPU 20A sets the instructed voltage value of the first DC-DC converter 25 to an initial value, and sets the instructed voltage value of the second DC-DC converter 26 to an initial value.

At step S101, the CPU 20A determines whether or not the control flag has been set to 1. In cases in which the CPU 20A determines that the control flag has been set to 1 (in cases in which step S101: YES), processing proceeds to step S108 in FIG. 5 via connector A. On the other hand, in cases in which the CPU 20A determines that the control flag has not been set to 1 (in cases in which step S101: NO), processing proceeds to step S102.

At step S102, the CPU 20A determines whether or not the first switching condition has been met. In the present exemplary embodiment, the first switching condition is met in cases in which the cooling water temperature of the first DC-DC converter 25 has reached the preset first temperature. In cases in which the CPU 20A determines that the first switching condition has been met (in cases in which step S102: YES), processing proceeds to step S109 in FIG. 5 via connector B. On the other hand, in cases in which the CPU 20A determines that the first switching condition has not been met (in cases in which step S102: NO), processing proceeds to step S103.

At step S103, the CPU 20A sets the control flag to 0.

At step S104, the CPU 20A determines whether or not instructed voltage value of the first DC-DC converter 25 is a maximum value or greater. In cases in which the CPU 20A determines that the instructed voltage value of the first DC-DC converter 25 is the maximum value or greater (in cases in which step S104: YES), processing proceeds to step S106. On the other hand, in cases in which the CPU 20A determines that the instructed voltage value of the first DC-DC converter 25 is not the maximum value or greater, namely is less than the maximum value (in cases in which step S104: NO), processing proceeds to step S105.

At step S105, the CPU 20A sets the instructed voltage value of the first DC-DC converter 25 so as to be subject to feedback control according to a target value for the voltage of the auxiliary equipment battery 28, and sets the instructed voltage value of the second DC-DC converter 26 to a value corresponding to the instructed voltage value of the first DC-DC converter 25 minus V. Processing then returns to step S101 via connector D.

At step S106, the CPU 20A determines whether or not the instructed voltage value of the second DC-DC converter 26 is a smaller value than the instructed voltage value of the first DC-DC converter 25 minus V In cases in which the CPU 20A determines that the instructed voltage value of the second DC-DC converter 26 is a smaller value than the instructed voltage value of the first DC-DC converter 25 minus V (in cases in which step S106: YES), processing proceeds to step S105. On the other hand, in cases in which the CPU 20A determines that the instructed voltage value of the second DC-DC converter 26 is not a smaller value than the instructed voltage value of the first DC-DC converter 25 minus V, namely is equal to or greater than a value corresponding to the instructed voltage value of the first DC-DC converter 25 minus V (in cases in which step S106: NO), processing proceeds to step S107.

At step S107, the CPU 20A sets the instructed voltage value of the first DC-DC converter 25 to the maximum value, and sets the instructed voltage value of the second DC-DC converter 26 so as to be subject to feedback control according to the target value for the voltage of the auxiliary equipment battery 28. Processing then returns to step S101 via connector D.

At step S108 in FIG. 5, the CPU 20A determines whether or not the second switching condition has been met. In the present exemplary embodiment, the second switching condition is met in cases in which the cooling water temperature of the first DC-DC converter 25 has reached the second temperature, this being a preset temperature that is lower than the first temperature. In cases in which the CPU 20A determines that the second switching condition has been met (in cases in which step S108: YES), processing proceeds to step S103 in FIG. 4 via connector C. On the other hand, in cases in which the CPU 20A determines that the second switching condition has not been met (in cases in which step S108: NO), processing transitions to step S109.

At step S109, the CPU 20A sets the control flag to 1.

At step S110, the CPU 20A determines whether or not the instructed voltage value of the second DC-DC converter 26 is a maximum value or greater. In cases in which the CPU 20A determines that the instructed voltage value of the second DC-DC converter 26 is the maximum value or greater (in cases in which step S110: YES), processing proceeds to step S112. On the other hand, in cases in which the CPU 20A determines that the instructed voltage value of the second DC-DC converter 26 is not the maximum value or greater, namely is less than the maximum value (in cases in which step S110: NO), processing proceeds to step S111.

At step S111, the CPU 20A sets the instructed voltage value of the first DC-DC converter 25 to the instructed voltage value of the second DC-DC converter 26 minus V, and sets the instructed voltage value of the second DC-DC converter 26 so as to be subject to feedback control according to the target value for the voltage of the auxiliary equipment battery 28. Processing then returns to step S101 in FIG. 4 via connector D.

At step S112, the CPU 20A determines whether or not the instructed voltage value of the first DC-DC converter 25 is a smaller value than the instructed voltage value of the second DC-DC converter 26 minus V In cases in which the CPU 20A determines that the instructed voltage value of the first DC-DC converter 25 is a smaller value than the instructed voltage value of the second DC-DC converter 26 minus V (in cases in which step S112: YES), processing proceeds to step S111. On the other hand, in cases in which the CPU 20A determines that the instructed voltage value of the first DC-DC converter 25 is not a smaller value than the instructed voltage value of the second DC-DC converter 26 minus V, namely is equal to or greater than a value corresponding to the instructed voltage value of the second DC-DC converter 26 minus V (in cases in which step S112: NO), processing proceeds to step S113.

At step S113, the CPU 20A sets the instructed voltage value of the first DC-DC converter 25 so as to be subject to feedback control according to the target value for the voltage of the auxiliary equipment battery 28, and sets the instructed voltage value of the second DC-DC converter 26 to the maximum value. Processing then returns to step S101 via connector D.

The power control processing described above may be summarized as follows. Under normal circumstances in which the output of the main DC-DC converter 24 is more than sufficient, the instructed voltage value of the main DC-DC converter 24 is subject to feedback control according to the target value for the voltage of the auxiliary equipment battery 28 so as to maintain a voltage to the auxiliary equipment 32 (see step S105 and step S111).

On the other hand, when the main DC-DC converter 24 has reached its maximum output under excessive load, the instructed voltage value of the main DC-DC converter 24 is maximized, and the instructed voltage value of the sub DC-DC converter 24 is subject to feedback control according to the target value for the voltage of the auxiliary equipment battery 28 so as to maintain the voltage to the auxiliary equipment 32 (see step S107 and step S113). Although the voltage of the auxiliary equipment 32 decreases under excessive load, a subsequent decrease in the load of the auxiliary equipment 32 causes the voltage of the auxiliary equipment 32 to approach the instructed voltage value of the main DC-DC converter 24 (namely the maximum value). The instructed voltage value of the sub DC-DC converter 24 then drops due to the feedback control, and control returns to that performed under normal circumstances (see step S106, step S112).

Moreover, in the power control processing, in cases in which the first switching condition is satisfied, the prioritized DC-DC converter 24 is switched from the first DC-DC converter 25 to the second DC-DC converter 26, and in cases in which the second switching condition is satisfied, the prioritized DC-DC converter 24 is switched from the second DC-DC converter 26 to the first DC-DC converter 25. The following transition processing is executed when performing this switching.

Explanation follows regarding the transition processing performed when switching the prioritized DC-DC converter 24 from the first DC-DC converter 25 to the second DC-DC converter 26, with reference to FIG. 6. Note that when switching from the second DC-DC converter 26 to the first DC-DC converter 25, the first DC-DC converter 25 and the second DC-DC converter 26 may simply be interchanged in the flowchart, and so explanation thereof is omitted.

At step S200 in FIG. 6, the CPU 20A determines whether or not the instructed voltage value of the first DC-DC converter 25 is the instructed voltage value of the second DC-DC converter 26 or greater. In cases in which the CPU 20A determines that the instructed voltage value of the first DC-DC converter 25 is the instructed voltage value of the second DC-DC converter 26 or greater (in cases in which step S200: YES), processing proceeds to step S201. On the other hand, in cases in which the CPU 20A determines that the instructed voltage value of the first DC-DC converter 25 is not the instructed voltage value of the second DC-DC converter 26 or greater, namely in cases in which the CPU 20A determines that the instructed voltage value of the first DC-DC converter 25 is smaller than the instructed voltage value of the second DC-DC converter 26 (in cases in which step S200: NO), processing proceeds to step S202.

At step S201, the CPU 20A sets the instructed voltage value of the first DC-DC converter 25 so as to be subject to feedback control according to the target value for the voltage of the auxiliary equipment battery 28, and sets the instructed voltage value of the second DC-DC converter 26 to a value of the previous set value plus a. The initial value of the previous set value is the value set at step S105 or step S107 of the power control processing described above. Moreover, an increment value a is set to a value sufficiently smaller than, for example a value smaller than one tenth of, the instructed voltage values of the respective DC-DC converters 24. Processing then returns to step S200.

At step S202, the CPU 20A determines whether or not the instructed voltage value of the second DC-DC converter 26 is the maximum value or greater. In cases in which the CPU 20A determines that the instructed voltage value of the second DC-DC converter 26 is the maximum value or greater (in cases in which step S202: YES), processing proceeds to step S204. On the other hand, in cases in which the CPU 20A determines that the instructed voltage value of the second DC-DC converter 26 is not the maximum value or greater, namely is less than the maximum value (in cases in which step S202: NO), processing proceeds to step S203.

At step S203, the CPU 20A sets the instructed voltage value of the first DC-DC converter 25 to the instructed voltage value of the second DC-DC converter 26 minus V, and sets the instructed voltage value of the second DC-DC converter 26 so as to be subject to feedback control according to the target value for the voltage of the auxiliary equipment battery 28. The CPU 20A then ends the transition processing.

At step S204, the CPU 20A sets the instructed voltage value of the first DC-DC converter 25 so as to be subject to feedback control according to the target value for the voltage of the auxiliary equipment battery 28, and sets the instructed voltage value of the second DC-DC converter 26 to the maximum value. The CPU 20A then ends the transition processing.

Summary of Exemplary Embodiment

In the power supply system 10 of the present exemplary embodiment, the ECU 20 is configured to control the first DC-DC converter 25 and the second DC-DC converter 26 so as to supply power to the auxiliary equipment 32. The determination section 210 of the ECU 20 of the present exemplary embodiment determines whether or not a predetermined condition has been satisfied. In cases in which the predetermined condition is determined to have been satisfied, the control section 220 switches the DC-DC converter 24 prioritized for power supply to the auxiliary equipment 32. In the present exemplary embodiment, switching the prioritized DC-DC converter 24 in response to a trigger of a predetermined condition enables utilization of the first DC-DC converter 25 and the second DC-DC converter 26 to be well-balanced, and thereby enables the occurrence of premature faults to be suppressed.

The vehicle 12 of the present exemplary embodiment switches the utilization priority between the DC-DC converters 24 in response to a trigger of a predetermined condition in order to enable the voltage of the auxiliary equipment battery 28 to be stabilized.

In cases in which the cooling water temperature of the first DC-DC converter 25 rises to the first temperature when utilization of the first DC-DC converter 25 is being prioritized, the ECU 20 of the present exemplary embodiment switches the utilization priority to the second DC-DC converter 26 out of the DC-DC converters 24. The power supply system 10 is thus capable of suppressing disproportionately heavy utilization of the first DC-DC converter 25.

Moreover, the second temperature at which the ECU 20 of the present exemplary embodiment switches from the second DC-DC converter 26 to the first DC-DC converter 25 when the cooling water temperature of the first DC-DC converter 25 has dropped is set to a lower temperature than the first temperature. Due to providing a temperature difference between the condition for switching from the first DC-DC converter 25 to the second DC-DC converter 26 and the condition for switching from the second DC-DC converter 26 to the first DC-DC converter 25, the present exemplary embodiment is capable of suppressing hunting, in which frequent switching between the two DC-DC converters 24 occurs.

Moreover, in cases in which the instructed voltage value of the main DC-DC converter 24 is less than the maximum value, the ECU 20 of the present exemplary embodiment performs feedback control such that the instructed voltage value of the main DC-DC converter 24 becomes the target value for the voltage of the auxiliary equipment battery 28, and also performs control such that the instructed voltage value of the sub DC-DC converter 24 becomes a lower value than the instructed voltage value of the main DC-DC converter 24. On the other hand, in cases in which the instructed voltage value of the main DC-DC converter 24 has reached the maximum value, the ECU 20 performs control such that the instructed voltage value of the main DC-DC converter 24 remains at the maximum value, and performs feedback control such that the instructed voltage value of the sub DC-DC converter 24 becomes the target value for the voltage of the auxiliary equipment battery 28.

In this manner, according to the present exemplary embodiment, in cases in which the main DC-DC converter 24 has reached its maximum output, performing feedback control such that the instructed voltage value of the sub DC-DC converter 24 becomes the target value for the voltage of the auxiliary equipment battery 28 enables the voltage of the auxiliary equipment 32 to be maintained.

Moreover, in the present exemplary embodiment, when performing transition processing of the DC-DC converters 24, by gradually increasing the output of the sub DC-DC converter 24 before switching the main DC-DC converter 24, sudden changes in the power supply to the auxiliary equipment 32 during switching of the DC-DC converters 24 can be suppressed.

In particular, in the present exemplary embodiment, performing switching control of the DC-DC converters 24 based on the instructed voltage values of the respective DC-DC converters 24 suppresses sudden changes in the voltage of the auxiliary equipment 32. This enables operational stability of the auxiliary equipment 32 to be secured.

Second Exemplary Embodiment

In a second exemplary embodiment, the flow of transition processing differs from that of the first exemplary embodiment. Note that a power supply system 10 of the present exemplary embodiment has similar configuration to that of the first exemplary embodiment. Equivalent configurations are therefore allocated the same reference numerals, and detailed explanation thereof is omitted.

Figure 7:
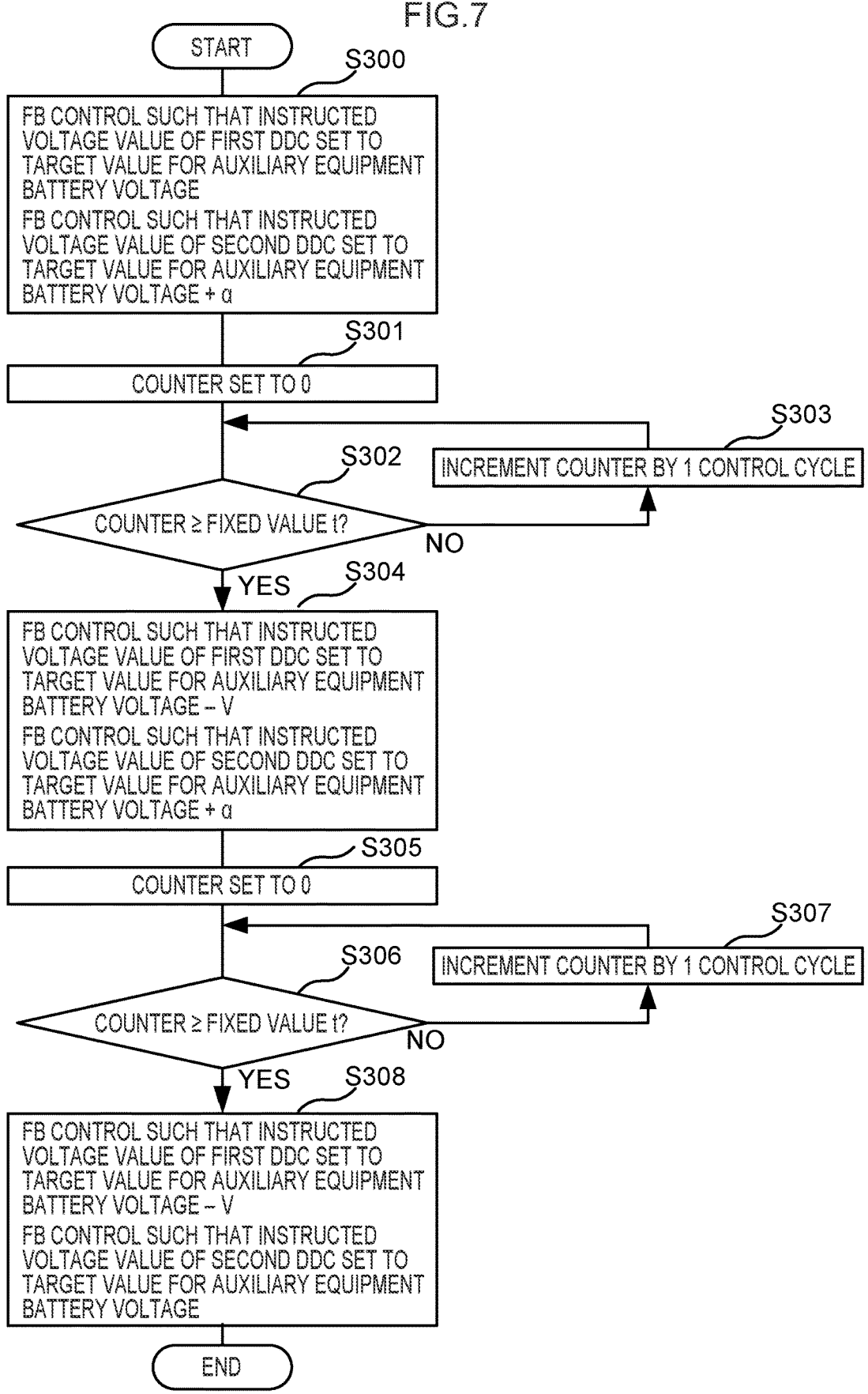
FIG. 7 is a flowchart illustrating a flow of transition processing of a second exemplary embodiment.

Explanation follows regarding the transition processing of the present exemplary embodiment, with reference to FIG. 7. Note that FIG. 7 illustrates an example of a case in which the prioritized DC-DC converter 24 is switched from the first DC-DC converter 25 to the second DC-DC converter 26. Note that when switching from the second DC-DC converter 26 to the first DC-DC converter 25, the first DC-DC converter 25 and the second DC-DC converter 26 may simply be interchanged in the flowchart, and so explanation thereof is omitted.

At step S300 in FIG. 7 the CPU 20A sets the instructed voltage value of the first DC-DC converter 25 so as to be subject to feedback control according to a target value for the voltage of the auxiliary equipment battery 28, and also sets the instructed voltage value of the second DC-DC converter 26 so as to be subject to feedback control according to the target value for the voltage of the auxiliary equipment battery 28 plus a. Note that as described above, the increment value a is set to a value sufficiently smaller than, for example a value smaller than one tenth of, the instructed voltage values of the respective DC-DC converters 24.

At step S301, the CPU 20A sets a counter to 0.

At step S302, the CPU 20A determines whether or not the counter has reached a fixed value t or greater. In cases in which the CPU 20A determines that the counter has reached the fixed value t or greater (in cases in which step S302:

YES), processing proceeds to step S304. On the other hand, in cases in which the CPU 20A determines that the counter has not reached the fixed value t or greater, namely in cases in which that the counter is less than the fixed value t (in cases in which step S302: NO), processing proceeds to step S303.

At step S303, the CPU 20A increments the counter by one control cycle. Processing then returns to step S302.

At step S304, the CPU 20A performs feedback control for the instructed voltage value of the first DC-DC converter 25 according to a value of the target value for the voltage of the auxiliary equipment battery 28 minus V, and also sets the instructed voltage value of the second DC-DC converter 26 so as to be subject to feedback control according to a value corresponding to the target value for the voltage of the auxiliary equipment battery 28 plus a.

At step S305, the CPU 20A sets the counter to 0.

At step S306, the CPU 20A determines whether or not the counter has reached the fixed value t or greater. In cases in which the CPU 20A determines that the counter has reached the fixed value t or greater (in cases in which step S306: YES), processing proceeds to step S308. On the other hand, in cases in which the CPU 20A determines that the counter has not reached the fixed value t or greater, namely in cases in which the counter is less than the fixed value t (in cases in which step S306: NO), processing proceeds to step S307.

At step S307, the CPU 20A increments the counter by one control cycle. Processing then returns to step S306.

At step S308, the CPU 20A performs feedback control for the instructed voltage value of the first DC-DC converter 25 according to a value of the target value for the voltage of the auxiliary equipment battery 28 minus V, and also sets the instructed voltage value of the second DC-DC converter 26 so as to be subject to feedback control according to a value of the target value for the voltage of the auxiliary equipment battery 28.

The present exemplary embodiment is capable of obtaining similar advantageous effects to those of the first exemplary embodiment. In particular, in the present exemplary embodiment, since feedback control is performed both when raising the instructed voltage value and lowering the instructed voltage value, sudden changes in the voltage of the auxiliary equipment 32 can be further suppressed when switching between the DC-DC converters 24.

Modified Examples

In the exemplary embodiments described above, a threshold value for the cooling water temperature of the first DC-DC converter 25 is provided as a "predetermined condition" serving as a trigger for switching between the DC-DC converters 24. Specifically, the first temperature is provided as a threshold value for the first switching condition to switch from the first DC-DC converter 25 to the second DC-DC converter 26, and the second temperature is provided as a threshold value for the second switching condition to switch from the second DC-DC converter 26 to the first DC-DC converter 25. However, "predetermined conditions" serving as triggers for switching between the DC-DC converters 24 are not limited thereto.

For example, in a first modified example, a threshold value for a device temperature of the first DC-DC converter 25 may be provided as a "predetermined condition". In such cases, similarly to in the exemplary embodiments described above, a first temperature is provided as a threshold value of the first switching condition, and a second temperature is provided as a threshold value of the second switching condition. Similarly to the exemplary embodiments described above, this modified example is also capable of suppressing hunting, in which frequent switching between the two DC-DC converters 24 occurs.

As another example, in a second modified example, "predetermined conditions" may be set based on a relationship between a device temperature of the first DC-DC converter 25 and a device temperature of the second DC-DC converter 26. In such cases, for example, a situation in which the device temperature of the first DC-DC converter 25 has exceeded the device temperature of the second DC-DC converter 26 may be adopted as a first switching condition. Moreover, a situation in which the device temperature of the first DC-DC converter 25 has fallen below the device temperature of the second DC-DC converter 26 minus T may be adopted as a second switching condition. Note that as described above, the value of T is set to a value that does not lean excessively toward either the first DC-DC converter 25 or the second DC-DC converter 26 as the prioritized DC-DC converter 24, thus enabling hunting, in which frequent switching occurs between the two DC-DC converters 24, to be suppressed similarly to in the exemplary embodiments described above.

As another example, in a third modified example, starting and stopping of the auxiliary equipment 32 of the vehicle 12 that results in a given load may be set as "predetermined conditions". In such cases, starting of a given load may be adopted as a first switching condition, and stopping of the given load may be adopted as a second switching condition. In the present modified example, the given load may be selected as appropriate, specifically selected as a load corresponding to a combination of actuated auxiliary equipment 32, so as to enable excessive utilization of either one of the DC-DC converters 24 to be suppressed.

Remarks

Note that the various processing executed by the CPU 20A reading and executing software (a program) in the above exemplary embodiments may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The various processing described above may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Moreover, in the exemplary embodiments described above, explanation has been given regarding cases in which programs are stored in advance (installed) on a computer-readable non-transitory storage medium. For example, the control program 100 for the ECU 20 is stored in advance in the ROM 20B. However, there is no limitation thereto, and the programs may be provided in a format recorded on a non-transitory storage medium such as a compact disc read only memory (CD-ROM), digital versatile disc read only memory (DVD-ROM), or universal serial bus (USB) memory. Alternatively, the programs may be downloadable from an external device over a network.

The processing flows described above in the foregoing exemplary embodiments are merely examples, and unnecessary steps may be removed, additional steps may be provided, and the processing sequence may be changed within a range not departing from the spirit thereof.

What is claimed is:

1. A control device to control a first DC-DC converter and a second DC-DC converter that supply power to equipment, the control device comprising a processor configured to:
   determine whether or not a predetermined condition is satisfied;
   in a case in which the predetermined condition is determined to be satisfied, perform control to switch which of the DC-DC converters is prioritized for power supply to the equipment; and
   raise power output of a sub DC-DC converter, and thereafter lower power output of a main DC-DC converter to switch which of the DC-DC converters is prioritized for power supply.

2. The control device of claim 1, wherein the processor is further configured to:
   determine the predetermined condition to be satisfied in a case in which a temperature pertaining to the first DC-DC converter has risen to a first temperature; and
   in that case, switch a main DC-DC converter prioritized for power supply from the first DC-DC converter to the second DC-DC converter.

3. The control device of claim 2, wherein the processor is further configured to:
   determine the predetermined condition to be satisfied in a case in which the temperature pertaining to the first DC-DC converter has dropped to a second temperature lower than the first temperature; and
   in that case, switch the main DC-DC converter prioritized for power supply from the second DC-DC converter to the first DC-DC converter.

4. The control device of claim 3, wherein the second temperature is a temperature obtained by subtracting a predetermined value from a device temperature pertaining to the second DC-DC converter.

5. The control device of claim 1, wherein for switching which of the DC-DC converters is prioritized for power supply, the processor is further configured to raise an instructed voltage value of the sub DC-DC converter, and then, when the instructed voltage value of the sub DC-DC converter has reached an instructed voltage value of the main DC-DC converter, control the instructed voltage value of the main DC-DC converter to a lower value than the instructed voltage value of the sub DC-DC converter.

6. The control device of claim 1, wherein:
   in a case in which an instructed voltage value of a main DC-DC converter is less than a maximum value, the processor is further configured to perform feedback control such that the instructed voltage value of the main DC-DC converter becomes a target value, and to perform control such that an instructed voltage value of a sub DC-DC converter becomes a lower value than the instructed voltage value of the main DC-DC converter; and
   in a case in which the instructed voltage value of the main DC-DC converter has reached the maximum value, the processor is further configured to perform control such that the instructed voltage value of the main DC-DC converter remains at the maximum value and perform feedback control such that the instructed voltage value of the sub DC-DC converter becomes the target value.

7. A vehicle comprising:
   the control device of claim 1;
   a first battery configured to supply power to each of the first DC-DC converter and the second DC-DC converter; and
   a second battery configured to supply power to the equipment and to receive power supplied from each of the first DC-DC converter and the second DC-DC converter.

8. A control method executed with a computer to control a first DC-DC converter and a second DC-DC converter that supply power to equipment, the control method comprising:
   determining that a predetermined condition is satisfied;
   after determining that the predetermined condition is satisfied, performing control to switch which of the DC-DC converters is prioritized for power supply to the equipment; and
   raising power output of a sub DC-DC converter, and thereafter lowering power output of a main DC-DC converter to switch which of the DC-DC converters is prioritized for power supply.

9. A non-transitory computer-readable storage medium storing a control program to control a first DC-DC converter and a second DC-DC converter that supply power to equipment, by causing a computer to execute processing comprising:
   determining that a predetermined condition is satisfied;
   after determining that the predetermined condition is satisfied, performing control to switch which of the DC-DC converters is prioritized for power supply to the equipment; and
   raising power output of a sub DC-DC converter, and thereafter lowering power output of a main DC-DC converter to switch which of the DC-DC converters is prioritized for power supply.

* * * * *